(12) United States Patent
Oh et al.

(10) Patent No.: US 10,667,333 B2
(45) Date of Patent: May 26, 2020

(54) INDUCTION HEAT COOKING APPARATUS

(71) Applicant: LG ELECTRONICS INC., Seoul (KR)

(72) Inventors: Dooyong Oh, Seoul (KR); Hyunwook Moon, Seoul (KR); Seungbok Ok, Seoul (KR); Byeongwook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 868 days.

(21) Appl. No.: 15/189,566

(22) Filed: Jun. 22, 2016

(65) Prior Publication Data
US 2016/0374153 A1 Dec. 22, 2016

(30) Foreign Application Priority Data
Jun. 22, 2015 (KR) .................. 10-2015-0088605

(51) Int. Cl.
*H05B 6/06* (2006.01)
*H05B 6/12* (2006.01)

(52) U.S. Cl.
CPC .......... *H05B 6/065* (2013.01); *H05B 6/1254* (2013.01); *H05B 2206/022* (2013.01); *Y02B 40/126* (2013.01)

(58) Field of Classification Search
CPC .................. H05B 6/065; H05B 6/1272; H05B 2206/022; Y02B 40/126

USPC ........ 219/620–622, 624–628, 662, 663, 489, 219/443.1, 656, 660, 661, 665–669, 219/448.11, 614, 647, 675, 676; 385/65; 174/72 A, 84 C, 68.1, 97; 248/68.1, 49; 361/825, 826; 336/195, 65, 67; 200/303

See application file for complete search history.

(56) References Cited

U.S. PATENT DOCUMENTS

| | | | | |
|---|---|---|---|---|
| 5,428,207 A | * | 6/1995 | Essig | ................... H05B 6/1254 219/622 |
| 2012/0014650 A1 | * | 1/2012 | Duis | .................... G02B 6/3839 385/65 |
| 2014/0151365 A1 | * | 6/2014 | Oh | ......................... H05B 6/065 219/620 |
| 2016/0338153 A1 | * | 11/2016 | Chinazzo | ............. H05B 6/1254 |

* cited by examiner

*Primary Examiner* — Dana Ross
*Assistant Examiner* — Joseph M Baillargeon
(74) *Attorney, Agent, or Firm* — Fish & Richardson P.C.

(57) ABSTRACT

An electronic induction heat cooking apparatus includes a rectifier for rectifying an input voltage and outputting a direct current (DC) voltage, a plurality of switching elements for switching the DC voltage output through the rectifier, a plurality of heating coils for heating a cooking utensil by controlling the plurality of switching elements, a controller for controlling the plurality of switching elements, and a support member including grooves, into which the heating coils are inserted. A width of a cross section of each of the grooves decreases toward an entrance of each of the grooves.

9 Claims, 13 Drawing Sheets

INDUCTION HEAT COOKING APPARATUS

CROSS-REFERENCE TO RELATED APPLICATIONS

The present application claims priority under 35 U.S.C. 119 and 35 U.S.C. 365 to Korean Patent Application No. 10-2015-0088605 filed on Jun. 22, 2015, which is hereby incorporated by reference in its entirety.

BACKGROUND

In general, an electronic induction heat cooking apparatus is an electric cooking apparatus for performing a cooking function by passing high-frequency current through a working coil or a heating coil and heating a cooking utensil by eddy current flowing when a strong line of magnetic force generated by the high-frequency current passes through the cooking utensil.

In the basic heating principle of the electronic induction heat cooking apparatus, the cooking utensil which is a magnetic body generates heat by induction heating as current is applied to a heating coil, and the cooking utensil itself is heated by the generated heat, thereby cooking food.

An inverter used for the electronic induction heat cooking apparatus serves to switch a voltage applied to the heating coil such that high-frequency current flows in the heating coil. The inverter drives a switching element generally composed of an insulated gate bipolar transistor (IGBT) such that high-frequency current flows in the heating coil, thereby forming a high-frequency magnetic field in the heating coil.

When the electronic induction heat cooking apparatus includes two heating coils, two inverters including four switching elements are required to operate the two heating coil.

Figure 1:
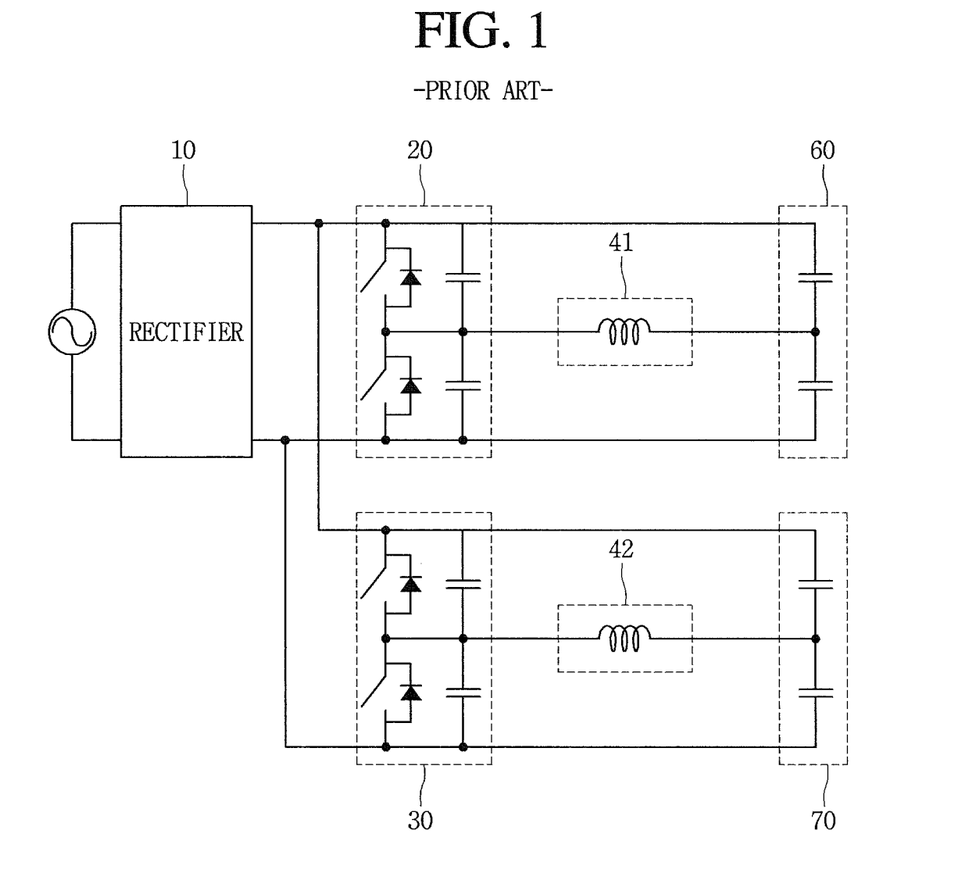
FIG. 1 is a diagram explaining a conventional induction heat cooking apparatus.

FIG. 1 is a diagram explaining a conventional induction heat cooking apparatus.

FIG. 1 shows an induction heat cooking apparatus including two inverters and two heating coils.

Referring to FIG. 1, the induction heat cooking apparatus includes a rectifier 10, a first inverter 20, a second inverter 30, a first heating coil 40, a second heating coil 50, a first resonance capacitor 60 and a second resonance capacitor 70.

In the first and second inverters 20 and 30, two switching elements for switching input voltages are connected in series and first and second heating coils 40 and 50 driven by the output voltages of the switching elements are connected to the contact points of the switching elements connected in series. The other sides of the first and second heating coils 40 and 50 are connected to the resonance capacitors 60 and 70.

The switching elements are driven by a drive unit and are alternately switched at switching times output from the drive unit, thereby applying high-frequency voltages to the heating coils. Since the on/off times of the switching elements driven by the drive unit are controlled to be gradually compensated for, the voltage supplied to the heating coil is changed from a low voltage to a high voltage.

However, the induction heat cooking apparatus includes two inverter circuits including four switching elements in order to operate two heating coils. Therefore, the volume and price of a product increase.

When the number of heating coils is three or more, the number of switching elements increases according to the number of heating coils.

In addition, in the conventional electronic induction heat cooking apparatus, the heating coils may be easily removed after the heating coils are mounted, due to the structure of a support member supporting the heating coils and a magnetic member.

SUMMARY

An object of an embodiment of the present invention is to provide an electronic induction heat cooking apparatus having a plurality of heating coils, which is capable of being controlled using a minimum number of switching elements.

Another object of the present invention is to provide an electronic induction heat cooking apparatus having a plurality of heating coils simultaneously driven using a minimum number of switching elements.

Another object of the present invention is to provide an electronic induction heat cooking apparatus including a support member, from which a plurality of heating coils cannot be easily removed, by improving the structure of the support member supporting the heating coils and a magnetic member.

An electronic induction heat cooking apparatus of the present invention includes a plurality of heating coils for heating a cooking utensil by controlling a plurality of switching elements, a controller for controlling the plurality of switching elements, and a support member including grooves, into which the heating coils are inserted. A width of a cross section of each of the grooves decreases toward an entrance of each of the grooves.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 2:
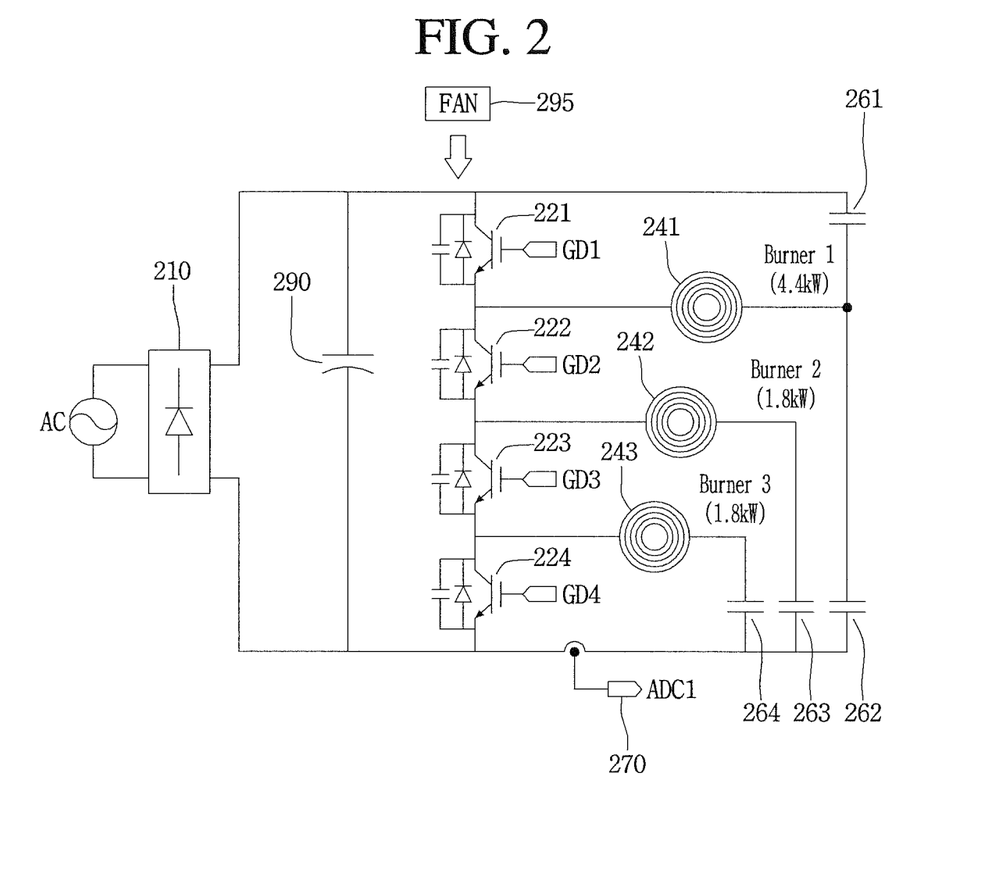
FIG. 2 is a diagram explaining the structure of an electronic induction heat cooking apparatus according to an embodiment of the present invention.

FIG. 2 is a diagram explaining the structure of an electronic induction heat cooking apparatus according to an embodiment of the present invention.

Referring to FIG. 2, the electronic induction heat cooking apparatus includes a rectifier 210 for receiving an external commercial AC voltage and rectifying the AC voltage into a DC voltage, a first switching element 221, a second switching element 222, a third switching element 223 and a fourth element 224 connected between positive and negative voltage terminals of the rectifier 210 in series and switched according to control signals, a first heating coil 241 having one end connected to a contact point between the first switching element 221 and the second switching element 222 and the other end connected between the first resonance capacitor 261 connected to one end of the rectifier 210 and the second resonance capacitor 262 connected to the other end of the rectifier 210, a second heating coil 242 having one end connected to a contact point between the second switching element 222 and the third switching element 223 and the other end connected to the third resonance capacitor 263 connected to the other end of the rectifier 210, and a third heating coil 243 having one end connected to a contact point between the third switching element 223 and the fourth switching element 224 and the other end connected to the fourth resonance capacitor 264 connected to the other end of the rectifier 210.

In addition, although not shown, a controller for controlling switching operations of the switching elements 221, 222, 223 and 224 is further included. In the embodiment, three heating coils are included.

In the embodiment, when the number of heating coils is N, N+1 switching elements may be included and the heating coils may be driven while minimizing the number of switching elements.

One end of the first switching element 221 is connected to the positive voltage terminal and the other end thereof is connected to the second switching element 222. One end of the second switching element 222 is connected to the first switching element 221 and the other end thereof is connected to the third switching element 223. One end of the third switching element 223 is connected to the second switching element 222 and the other end thereof is connected to the fourth switching element 224. One end of the fourth switching element 224 is connected to the third switching element 223 and the other end thereof is connected to the negative voltage terminal.

In addition, a DC capacitor 290 connected across the rectifier 210 may be further included and the DC capacitor 290 reduces ripple of a DC voltage output from the rectifier 210.

Although, in the embodiment, the first heating coil 241 is connected between the first resonance capacitor 261 and the second resonance capacitor 262, the first resonance capacitor 261 may not be included.

Although, in the embodiment, the second heating coil 242 is connected to the third resonance capacitor 263, the second heating coil may be connected between an additional resonance capacitor (not shown) and the third resonance capacitor 263, similarly to the first heating coil 241.

Although, in the embodiment, the third heating coil 243 is connected to the fourth resonance capacitor 264, the third heating coil may be connected between an additional resonance capacitor (not shown) and the fourth resonance capacitor 264, similarly to the first heating coil 241.

In the switching elements 221, 222, 223 and 224, an anti-parallel diode may be connected and an auxiliary resonance capacitor connected to the anti-parallel diode in parallel may be connected to minimize switching loss of the switching elements.

The switching elements 221, 222, 223 and 224 may be arranged in a first direction. A cooling fan 295 is provided at one side of the switching elements 221, 222, 223 and 224 such that air from the cooling fan 295 flows in the first direction.

The first switching element 221 may be provided closest to the cooling fan 295 and then the second switching element 222, the third switching element 223 and the fourth switching element 224 may be arranged.

The first heating coil 241 is connected between the first switching element 221 and the second switching element 222, the second heating coil 242 is connected between the second switching element 222 and the third switching element 223, and the third heating coil 243 is connected between the third switching element 223 and the fourth switching element 224.

The power of the first heating coil 241 may be greater than that of the second heating coil 242 or the third heating coil 243 and the power of the second heating coil 242 may be equal to that of the third heating coil 243. In the embodiment, the power of the first heating coil 241 may be 4.4 kW and the power of the second heating coil 242 and the third heating coil 243 may be 1.8 kW.

Figure 3:
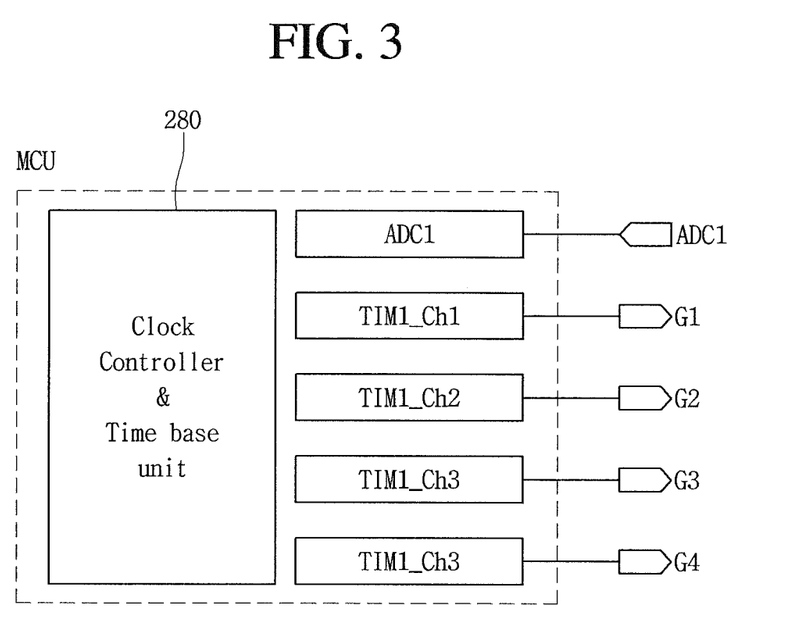
FIG. 3 is a diagram showing a controller for controlling a switching element according to an embodiment of the present invention.
Figure 4:
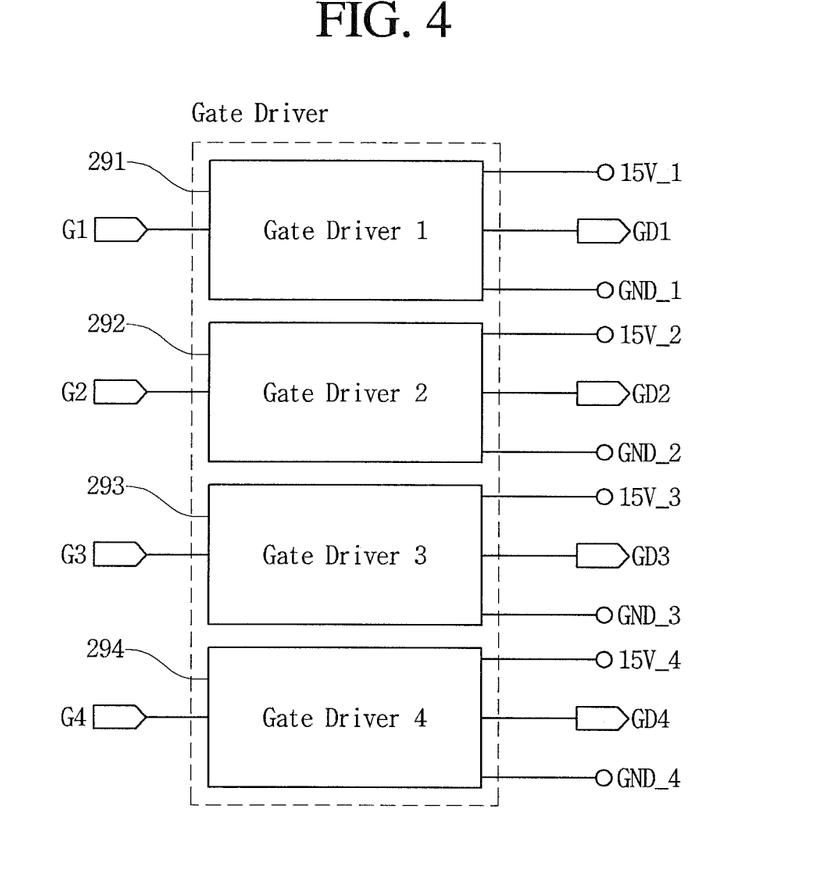
FIG. 4 is a diagram showing a gate driver for operating a switching element according to an embodiment of the present invention.
Figure 5:
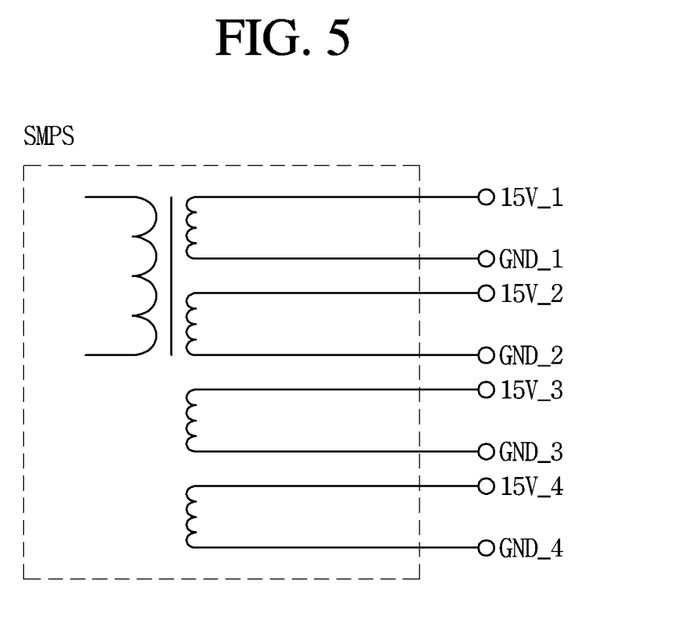
FIG. 5 is a diagram showing a switching mode power supply according to an embodiment of the present invention.

FIG. 3 is a diagram showing a controller for controlling a switching element according to an embodiment of the present invention, FIG. 4 is a diagram showing a gate driver for operating a switching element according to an embodiment of the present invention, and FIG. 5 is a diagram showing a switched-mode power supply according to an embodiment of the present invention.

Figure 6:
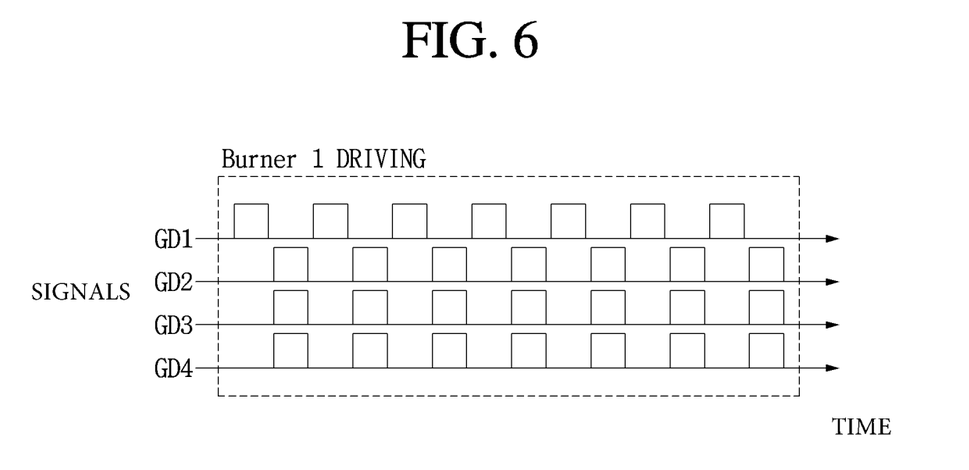
FIGS. 6 and 7 are diagrams showing a signal for driving each heating coil according to an embodiment of the present invention.

Referring to FIGS. 3 to 5, the controller 280 is connected to inputs G1, G2, G3 and G4 of first, second, third and fourth gate drivers 291, 292, 293 and 294 for driving the switching elements 221, 222, 223 and 224 and outputs GD1, GD2, GD3 and GD4 of the gate drivers 291, 292, 293 and 294 are connected to the gate terminals of the switching elements 221, 222, 223 and 224. As shown in FIG. 6, independent voltages of a multi-output switched-mode power supply (SMPS) are used as voltages supplied to the gate drivers 291, 292, 293 and 294.

Accordingly, the signal from the controller 280 is applied to the gate drivers 291, 292, 293 and 294 to drive the semiconductor switches, thereby controlling the switching elements 221, 222, 223 and 224.

A current converter 270 may be provided between the ground of the switching elements 221, 222, 223 and 224 connected in series and the first, second and third heating coils 241, 242 and 243. The current converter 270 measures current flowing in the first, second and third heating coils 241, 242 and 243 such that a current value is input to the controller 280 through an analog/digital converter (ADC) included in the controller 280. The controller 280 controls the switching elements 221, 222, 223 and 224 based on the current value.

Figure 7:
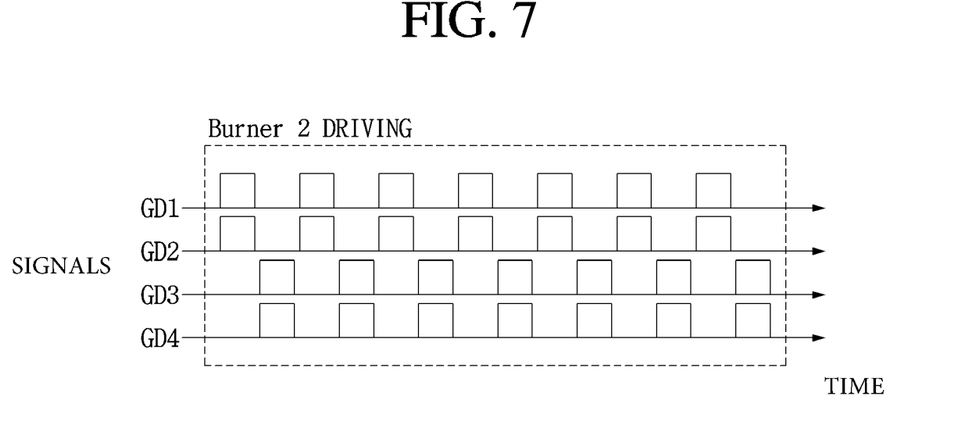

FIGS. 6 and 7 are diagrams showing a signal for driving each heating coil according to an embodiment of the present invention.

As shown in FIGS. 6 and 7, the controller 280 controls the switching elements 221, 222, 223 and 224 to control current flowing in the first, second and third heating coils 241, 242 and 243.

When driving the first heating coil 241, the controller 280 controls the first switching element 221 to be closed and controls the second, third and fourth switching elements 222, 223 and 224 to be opened during a half resonance period. During the remaining half resonance period, the controller controls the first switching element 221 to be opened and controls the second, third and fourth switching elements 222, 223 and 224 to be closed.

Through the above operation, during the half resonance period, an input voltage is applied to the first heating coil 241 and the first and second resonance capacitors 261 and 262 and thus resonance starts to increase current of the first heating coil 241. During the remaining half resonance period, the input voltage is reversely applied to the first heating coil 241 and the first and second resonance capacitors 261 and 262 and thus resonance starts to increase reverse current of the first heating coil 241.

As operation is repeated, eddy current is induced in the cooking utensil laid on the first heating coil 241 to operate the electronic induction heat cooking apparatus.

As shown in FIG. 7, when driving the second heating coil 242, the controller 280 controls the first switching element 221 and the second switching element 222 to be closed and controls the third and fourth switching elements 223 and 224 to be opened during a half resonance period. During the remaining half resonance period, the controller controls the first switching element 221 and the second switching element 222 to be opened and controls the third and fourth switching elements 223 and 224 to be closed.

Through the above operation, during the half resonance period, an input voltage is applied to the second heating coil 242 and the third resonance capacitor 263 and thus resonance starts to increase current of the second heating coil 242. During the remaining half resonance period, the input voltage is reversely applied to the second heating coil 242 and the third resonance capacitor 263 and thus resonance starts to increase reverse current of the second heating coil 242.

As operation is repeated, eddy current is induced in the cooking utensil laid on the second heating coil 242 to operate the electronic induction heat cooking apparatus.

Although not shown, when the third heating coil 243 is driven, during a half resonance period, the first, second and third switching elements 221, 222 and 223 are controlled to be closed and the fourth switching element 224 is controlled to be opened. During the remaining half resonance period, the first, second and third switching elements 221, 222 and 223 are controlled to be opened and the fourth switching element 224 is controlled to be closed.

The controller 280 controls the switching elements in this manner to drive the heating coils.

As described above, the electronic induction heat cooking apparatus according to the embodiment includes a plurality of heating coils and a minimum number of switching elements for driving the plurality of heating coils, thereby decreasing the size of the electronic induction heat cooking apparatus and reducing production costs.

Figure 8:
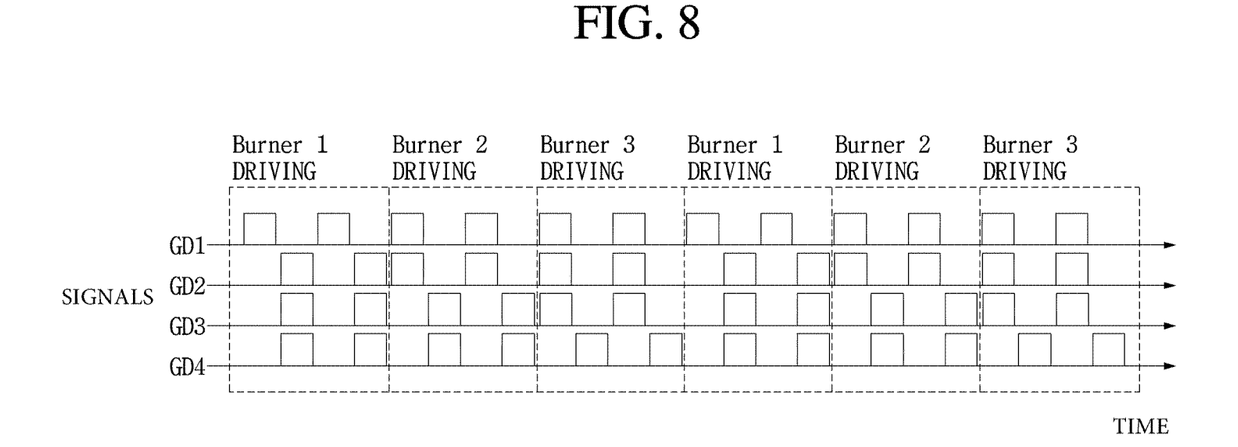
FIG. 8 is a diagram showing a signal for driving a plurality of heating coils using a time division method according to an embodiment of the present invention.

FIG. 8 is a diagram showing a signal for driving a plurality of heating coils using a time division method according to an embodiment of the present invention.

Referring to FIG. 8, when driving the first, second third heating coils 241, 242 and 243, the controller 280 first drives the first heating coil 241, then drives the second heating coil 242, and lastly drives the third heating coil 243. By repeating one period, the first, second third heating coils 241, 242 and 243 are all driven.

First, when driving the first heating coil 241, the controller 280 controls the first switching element 221 to be closed and controls the second, third and fourth switching elements 222, 223 and 224 to be opened during a half resonance period. During the remaining half resonance period, the controller controls the first switching element 221 to be opened and controls the second, third and fourth switching elements 222, 223 and 224 to be closed.

Through the above operation, during the half resonance period, an input voltage is applied to the first heating coil 241 and the first and second resonance capacitor 261 and 262 and thus resonance starts to increase current of the first heating coil 241. During the remaining half resonance period, the input voltage is reversely applied to the first heating coil 241 and the first and second resonance capacitor 261 and 262 and thus resonance starts to increase reverse current of the first heating coil 241.

As operation is repeated, eddy current is induced in the cooking utensil laid on the first heating coil 241 to operate the electronic induction heat cooking apparatus.

Subsequently, when driving the second heating coil 242, the controller 280 controls the first switching element 221 and the second switching element 222 to be closed and controls the third and fourth switching elements 223 and 224 to be opened during a half resonance period. During the remaining half resonance period, the controller controls the first switching element 221 and the second switching element 222 to be opened and controls the third and fourth switching elements 223 and 224 to be closed.

Through the above operation, during the half resonance period, an input voltage is applied to the second heating coil 242 and the third resonance capacitor 263 and thus resonance starts to increase current of the second heating coil 242. During the remaining half resonance period, the input voltage is reversely applied to the second heating coil 242 and the third resonance capacitor 263 and thus resonance starts to increase reverse current of the second heating coil 242.

As operation is repeated, eddy current is induced in the cooking utensil laid on the second heating coil 242 to operate the electronic induction heat cooking apparatus.

Similarly, when the third heating coil 243 is driven, during a half resonance period, the first, second and third switching elements 221, 222 and 223 are controlled to be closed and the fourth switching element 224 is controlled to be opened. During the remaining half resonance period, the first, second and third switching elements 221, 222 and 223 are controlled to be opened and the fourth switching element 224 is controlled to be closed.

When the first, second and third heating coils 241, 242 and 243 are all driven using the above-described method, the first, second third heating coils 241, 242 and 243 may be driven again starting from the first heating coil 241.

Figure 9:
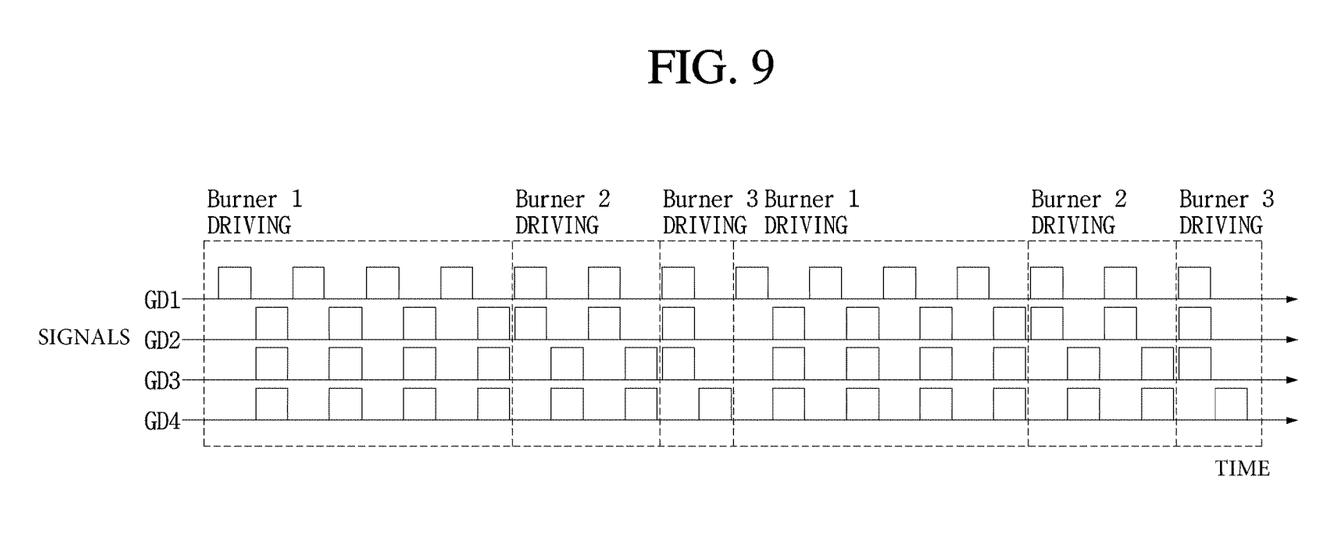
FIG. 9 is a diagram showing a signal for driving a plurality of heating coils using a duty control method according to an embodiment of the present invention.

FIG. 9 is a diagram showing a signal for driving a plurality of heating coils using a duty control method according to an embodiment of the present invention.

Referring to FIG. 9, when driving the first, second third heating coils 241, 242 and 243, the controller 280 performs duty control according to use of the first, second and third heating coils 241 (e.g., a large cooling utensil or a small cooking utensil) to drive the first, second and third heating coils 241, 242 and 243 and to compensate for power reduction by the time division method. The power of the first, second third heating coils 241, 242 and 243 is changed through frequency control and, when an output range is restricted due to frequency limit, this may be compensated for through duty control.

As shown in FIG. 9, the first heating coil 241 repeats the resonance period four times, the second heating coil 242 repeats the resonance period twice, and the third heating coil 342 repeats the resonance period once.

Accordingly, the first, second and third heating coils 241, 242 and 243 may be driven together, with different powers according to use thereof or user's need.

Figure 10:
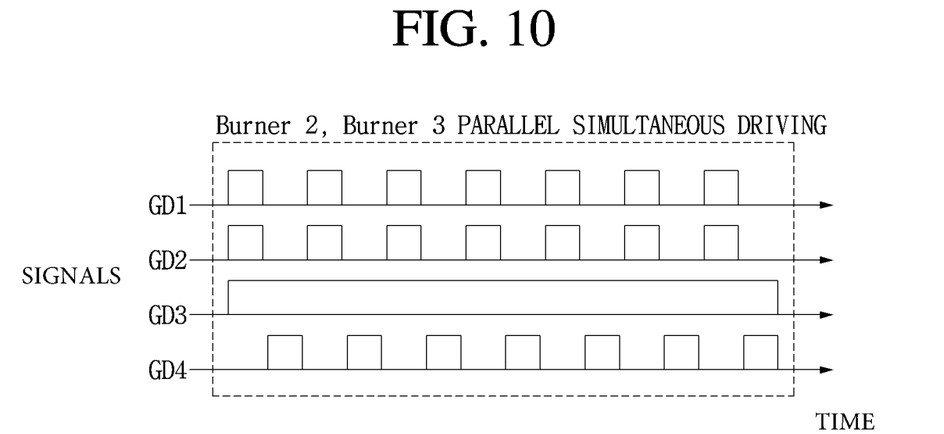
FIG. 10 is a diagram showing a signal for driving two heating coils using a parallel driving method according to an embodiment of the present invention.

FIG. 10 is a diagram showing a signal for driving two heating coils using a parallel driving method according to an embodiment of the present invention.

Referring to FIG. 10, when simultaneously driving the second and third heating coils 242 and 243, the controller 280 controls the third switching element 223 to be closed. In addition, the controller controls the first and second switching elements 221 and 222 to be closed and controls the fourth switching element 224 to be opened, during a half resonance period. During the remaining half resonance period, the first and second switching elements 221 and 222 are controlled to be opened and the fourth switching element 224 is controlled to be closed.

Since the third switching element 223 remains in the closed state, the second heating coil 242 and the third heating coil 243 are connected in parallel.

Accordingly, through the above operation, during the half resonance period, an input voltage is applied to the second and third heating coils 242 and 243 and the third and fourth resonance capacitors 263 and 264 and thus resonance starts to increase current in the second and third heating coils 242 and 243. During the remaining half resonance period, an input voltage is reversely applied to the second and third heating coils 242 and 243 and the third and fourth resonance capacitors 263 and 264 and thus resonance starts to increase reverse current in the second and third heating coils 242 and 243.

At this time, the second and third heating coils 242 and 243 operating using the parallel driving method have the same power. In the embodiment, the power of the second and third heating coils 242 and 243 is 1.8 kW.

In addition, the power of the second and third heating coils 242 and 243 operating using the parallel driving method may be less than that of the first heating coil 241.

As operation is repeated, eddy current is induced in the cooking utensil laid on the second and third heating coils 242 and 243 to operate the electronic induction heat cooking apparatus.

Figure 11:
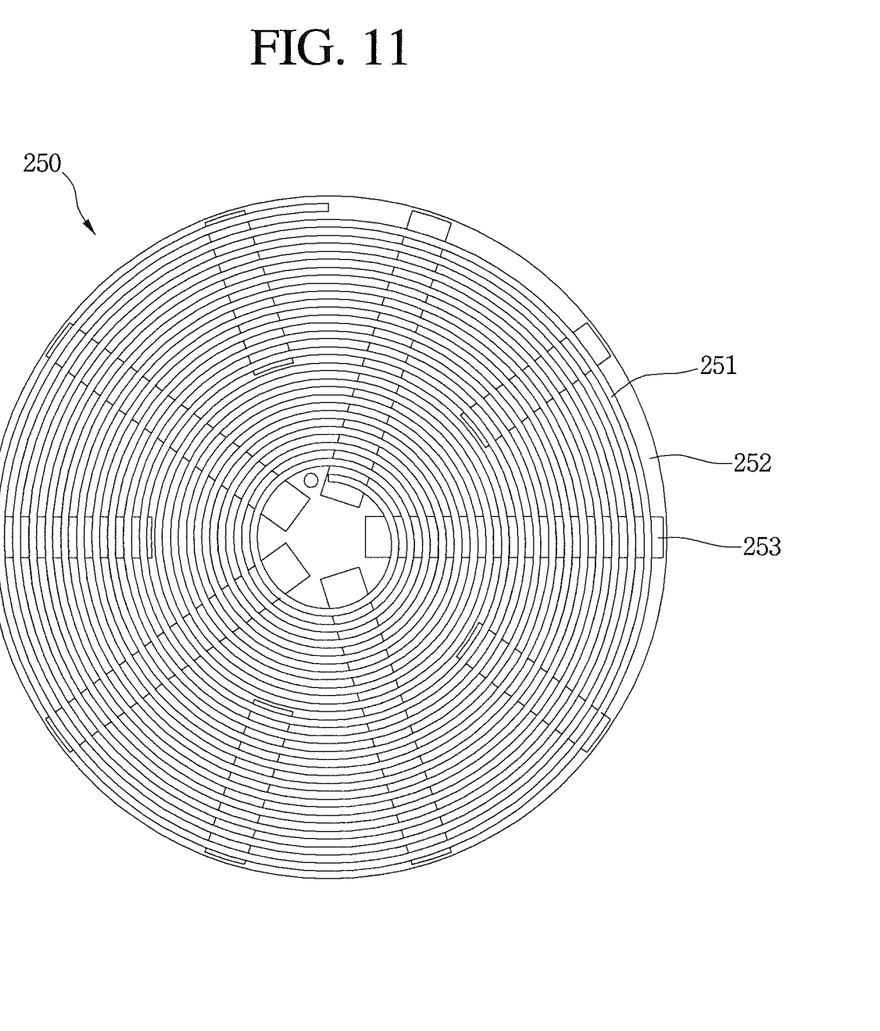
FIGS. 11 and 12 are views showing front and rear surfaces of a support member of an electronic induction heat cooking apparatus according to an embodiment of the present invention.
Figure 12:
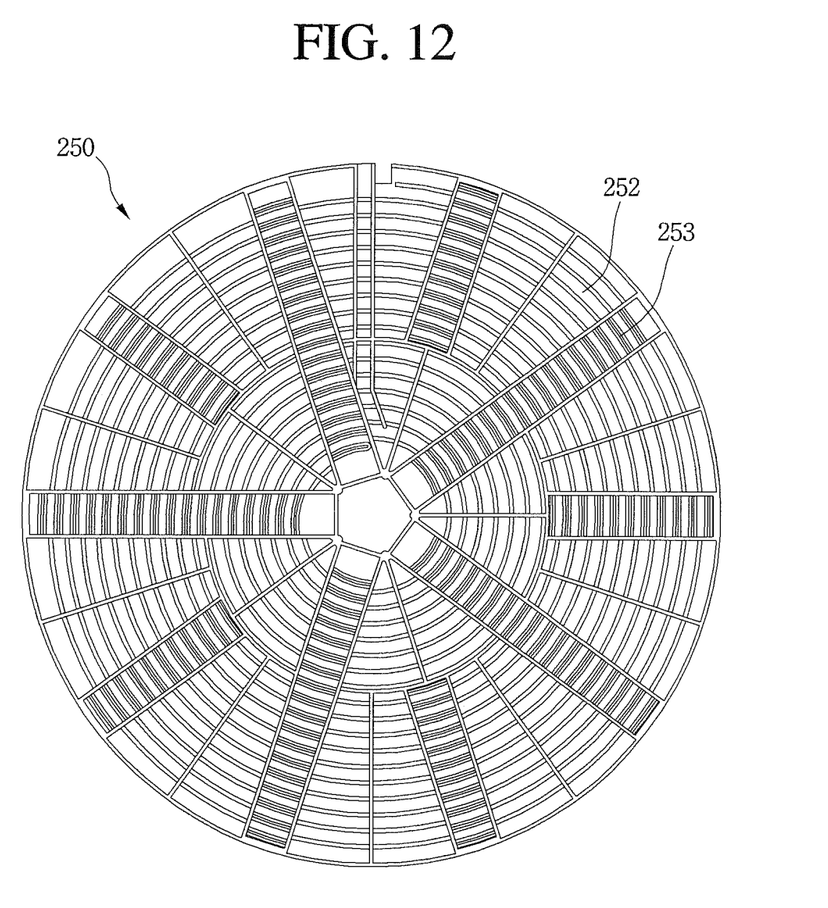

FIGS. 11 and 12 are views respectively showing front and rear surfaces of a support member of an electronic induction heat cooking apparatus according to an embodiment of the present invention.

Referring to FIGS. 11 and 12, the support member 250 includes a coil support part 251 having a spiral shape, a reinforcement part 252 supporting the coil support part 251 having the spiral shape and a magnetic member insertion part 253 provided between the reinforcement part 252 and the reinforcement part 252 and having a magnetic member inserted thereinto.

In the present invention, the coil support part 251 is formed on a front surface of the support member and the heating coils are formed on the front surface of the support member. The magnetic member insertion part 253 is formed on a rear surface of the support member and the magnetic member is provided on the rear surface of the support member.

As shown in FIG. 12, a plurality of magnetic member insertion parts 253 may be formed. In addition, the magnetic member insertion parts 253 may extend in a radial direction and include a plurality of magnetic member insertion parts 253 having a first length and a plurality of magnetic member insertion parts 253 having a second length less than the first length.

Figure 13:
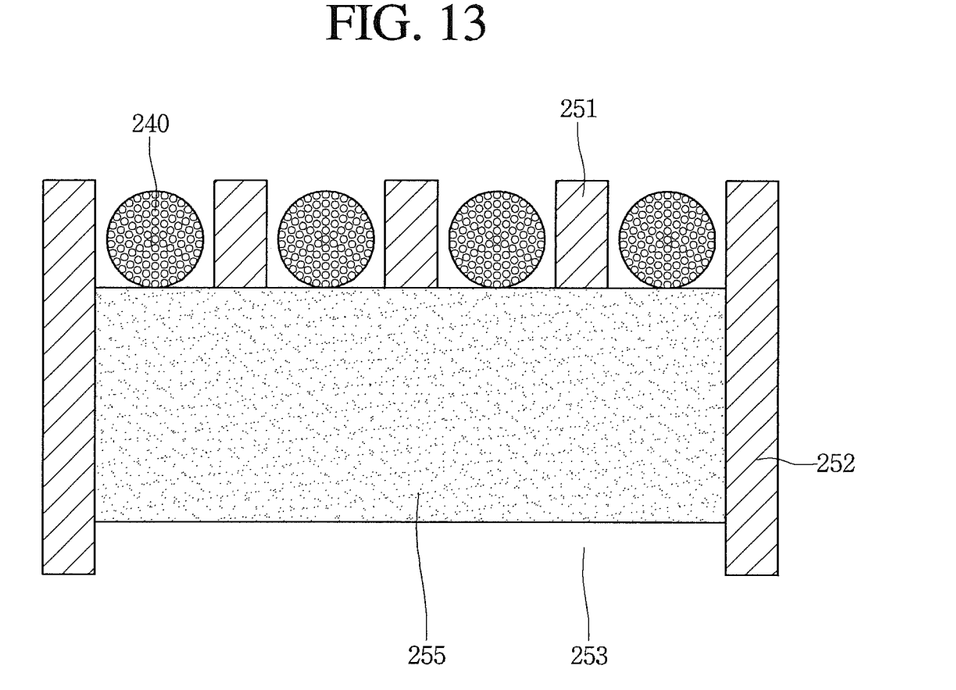
FIGS. 13 and 14 are cross-sectional views of the support member of an electronic induction heat cooking apparatus according to an embodiment of the present invention.
Figure 14:
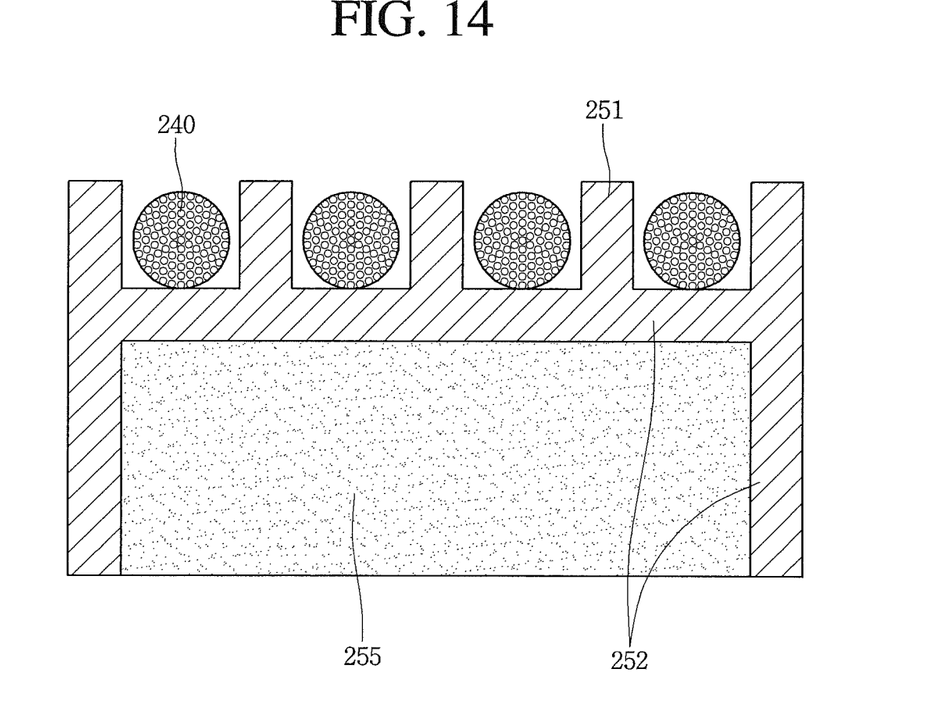

FIGS. 13 and 14 are cross-sectional views of a support member of an electronic induction heat cooking apparatus according to an embodiment of the present invention.

In the embodiment shown in FIG. 13, a part of the support member 250 may be formed of the coil support part 251 and the reinforcement part 252. A magnetic member insertion part 253 is provided at the lower side of the support member. Heating coils 240 are wound in the coil support part 251 and a magnetic member 255 is provided in the magnetic member insertion part 253. The heating coils 240 and the magnetic member 255 are in contact with each other, thereby increasing magnetic efficiency.

In the embodiment shown in FIG. 14, a part of the support member 250 may be formed of the coil support part 251 and the reinforcement part 252. A magnetic member insertion part 253 is provided below the reinforcement part 252. Heating coils 240 may be wound in the coil support part 251 and a magnetic member 255 may be provided in the magnetic member insertion part 253.

The heating coils 240 and the magnetic member 255 are spaced apart from each other, but the coil support part 251 may be more stably supported by the reinforcement part 252.

A groove is formed between the coil support part 251 and the coil support part 251 such that the heating coil 240 is provided in the groove. When the output of the heating coil 240 increases, current flowing in the heating coil 240 increases, increasing the amount of heat, and the number of turns of the heating coil 240 should increase in order to reduce the amount of heat. In this case, since the cross-sectional area of the heating coil 240 increases, the height of the groove should increase. In contrast, in order to increase efficiency, the height of the groove needs to be decreased.

Accordingly, in order to mount the heating coil 240 with high efficiency and large output, there is a need for a groove which has a large width in a state in which the height of the groove is restricted and prevents the heating coil 240 from being easily removed. Hereinafter, an electronic induction heat cooking apparatus including a support member satisfying the above-described conditions will be described.

Figure 15:
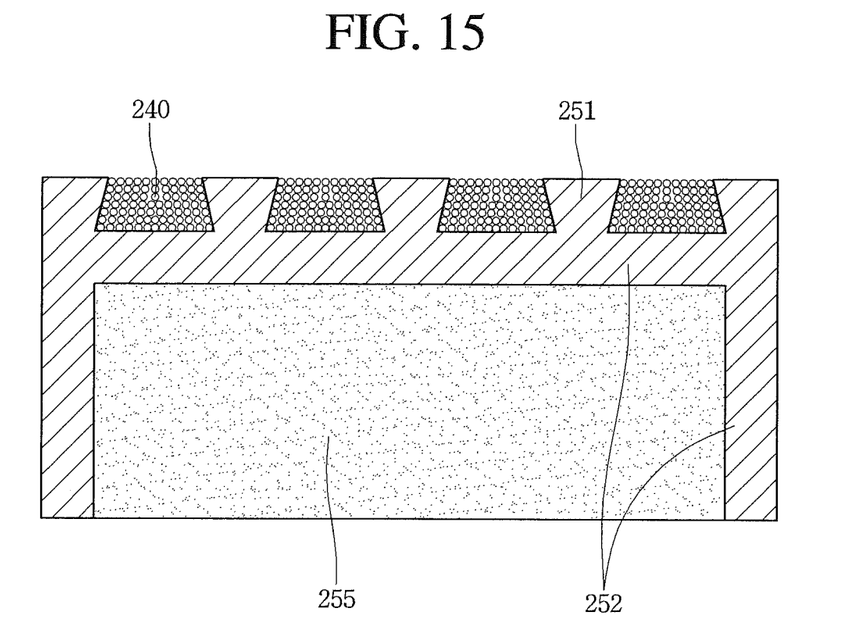
FIG. 15 is a cross-sectional view of a support member of an electronic induction heat cooking apparatus according to another embodiment of the present invention.

FIG. 15 is a cross-sectional view of a support member of an electronic induction heat cooking apparatus according to another embodiment of the present invention.

Referring to FIG. 15, in the electronic induction heat cooking apparatus of the present invention, a heating coil 240 and a magnetic member 255 are coupled to a support member 250 and a reinforcement part 252 supporting a coil support part 251 is interposed between the heating coil 240 and the magnetic member 255. Of course, as described with reference to FIG. 13, the coil support part 251 may not be provided between the heating coil 240 and the magnetic member 255.

The heating coil 240 is provided in a groove formed between the coil support part 251 and the coil support part 251. In the embodiment, the cross-section of the groove has a trapezoidal shape and the length of the upper edge is less than that of the lower edge. That is, as the distance from the magnetic member 255 increases, the width of the groove may decrease.

Figure 16:
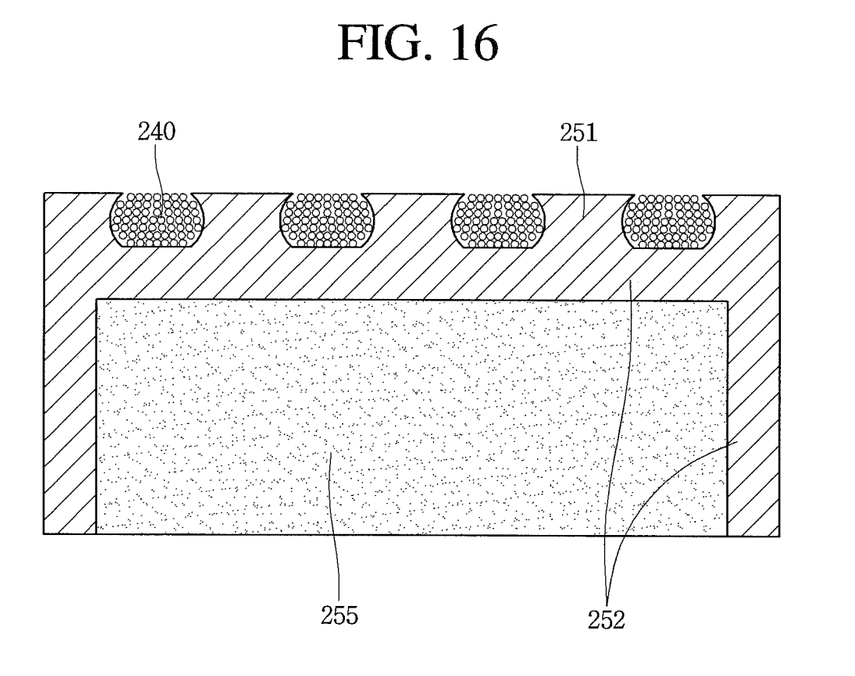
FIG. 16 is a cross-sectional view of a support member of an electronic induction heat cooking apparatus according to another embodiment of the present invention.

FIG. 16 is a cross-sectional view of a support member of an electronic induction heat cooking apparatus according to another embodiment of the present invention.

Referring to FIG. 16, the heating coil 240 is provided in a groove formed between the coil support part 251 and the coil support part 251. In the embodiment, in the cross-section of the groove, the central part of the groove is convex and the side surface of the groove is a curved surface. As the distance from the magnetic member 255 increases, the width of the groove gradually increases and then gradually decreases.

As shown in FIGS. 15 and 16, the entrance of the groove may be narrow or the width of the cross section of the groove may decrease toward the entrance of the groove.

Meanwhile, as shown in FIGS. 15 and 16, even in the support member including a groove, the width of which decreases toward the entrance of the groove, the heating coil 240 and the magnetic member 255 are in contact with each other like the support member of FIG. 13, thereby increasing magnetic efficiency.

The embodiment of the present invention provides an electronic induction heat cooking apparatus having a plurality of heating coils, which is capable of being controlled using a minimum number of switching elements.

In addition, the embodiment of the present invention provides an electronic induction heat cooking apparatus having a plurality of heating coils simultaneously driven using a minimum number of heating coils.

In addition, the embodiment of the present invention provides an electronic induction heat cooking apparatus including a support member, from which a plurality of heating coils cannot be easily removed, by improving the structure of the support member supporting the heating coils and a magnetic member.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic induction heat cooking apparatus comprising:
 a rectifier configured to rectify an input voltage and to output a direct current (DC) voltage;
 a plurality of switching elements configured to switch the DC voltage output through the rectifier;
 a plurality of heating coils configured to heat a cooking utensil based on operation of the plurality of switching elements;
 a controller configured to control the plurality of switching elements; and
 a support member configured to support the heating coils and a magnetic member, the support member comprising:
  a plurality of coil support parts that extend in a spiral shape about a center of the heating coils and that define a plurality of grooves disposed between the coil support parts, each of the grooves being configured to receive one or more of the heating coils, and
  a plurality of reinforcement parts that support the coil support parts and that define a magnetic member insertion part disposed between the reinforcement parts and configured to receive the magnetic member therein,
 wherein the heating coils are configured to be received between and wound along the coil support parts and to contact the magnetic member received in the magnetic member insertion part to thereby increase magnetic efficiency,
 wherein a width of a cross section of each of the grooves decreases toward an entrance of each of the grooves,
 wherein the reinforcement parts extend in a vertical direction, each of the reinforcement parts having a first vertical portion that contacts a side surface of the magnetic member and a second vertical portion that extends from the first vertical portion in the vertical direction and that faces one or more side surfaces of the heating coils,
 wherein each of the coil support parts is disposed at a position corresponding to the second vertical portion of the reinforcement parts, and
 wherein the magnetic member insertion part is configured to receive the magnetic member in a state in which an upper side of the magnetic member is in contact with lower sides of the heating coils and lower sides of the coil support parts.

2. The electronic induction heat cooking apparatus according to claim 1, wherein each of the grooves has a trapezoidal shape having a length of an upper edge that is less than a length of a lower edge.

3. The electronic induction heat cooking apparatus according to claim 1, wherein a side surface of each of the grooves is a curved surface and a central part of each of the grooves is convex.

4. The electronic induction heat cooking apparatus according to claim 1, wherein the width of the cross section of each of the grooves decreases as a distance from the magnetic member insertion part increases.

5. The electronic induction heat cooking apparatus according to claim 1, wherein the grooves have a spiral shape.

6. The electronic induction heat cooking apparatus according to claim 1, wherein the magnetic member insertion part comprises:
   a plurality of first magnetic member insertion parts that are arranged along a radial direction of the heating coils and that have a first length in the radial direction; and
   a plurality of second magnetic member insertion parts that are arranged along the radial direction and that have a second length less than the first length in the radial direction.

7. The electronic induction heat cooking apparatus according to claim 6, wherein the first magnetic member insertion parts are arranged about the center of the heating coils, and
   wherein the second magnetic member insertion parts are arranged about the center of the heating coils.

8. The electronic induction heat cooking apparatus according to claim 7, wherein the first magnetic member insertion parts and the second magnetic member insertion parts are alternately arranged along a circumferential direction about the center of the heating coils.

9. The electronic induction heat cooking apparatus according to claim 7, wherein a first inner end of the first magnetic member insertion parts is closer to the center of the heating coils in the radial direction than a second inner end of the second magnetic member insertion parts.

\* \* \* \* \*